Aug. 1, 1967
C. P. PFAELZER ET AL 3,334,297
APPARATUS FOR MEASURING WELDING POWER UTILIZING
A WELD SIMULATING RESISTOR SENSOR
Original Filed Feb. 27, 1962
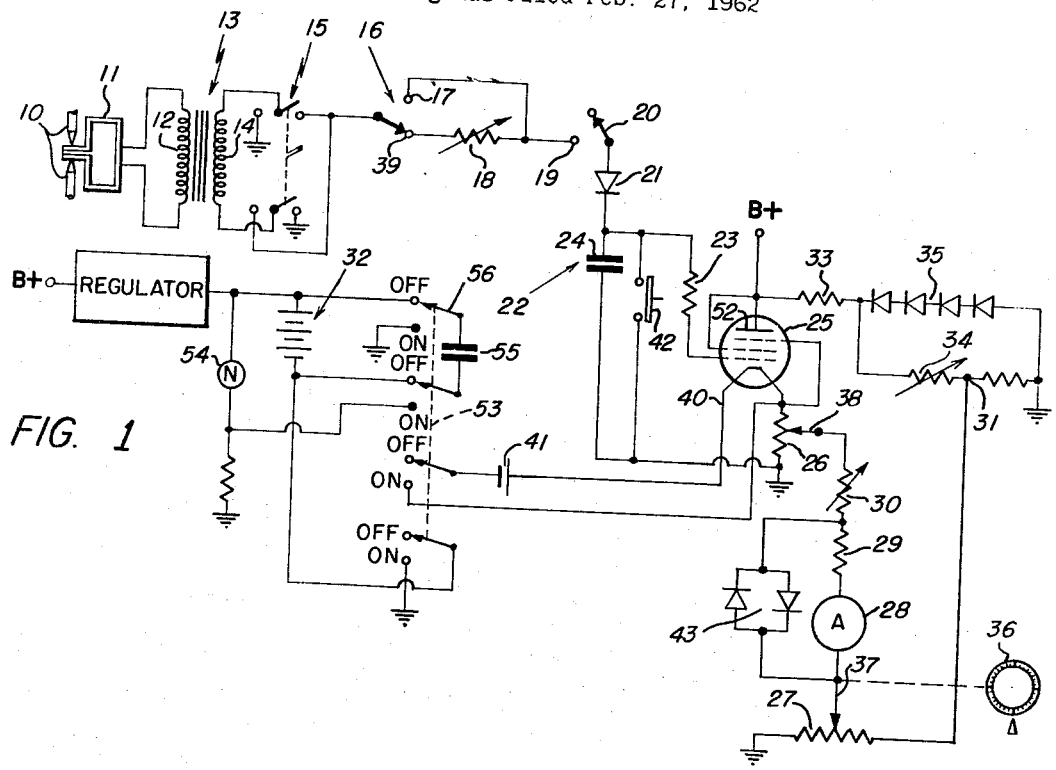
FIG. 1
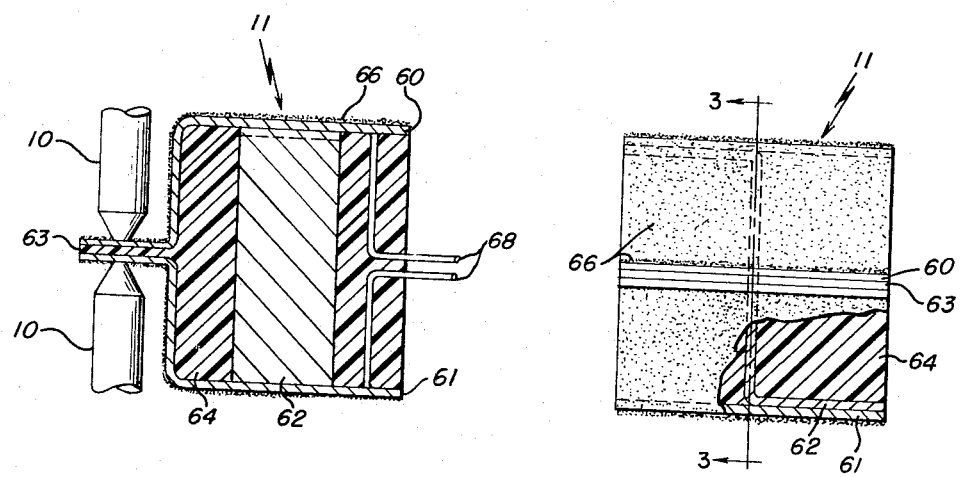
FIG. 3
FIG. 2
INVENTORS
CARTER P PFAELZER
SANTO A. SAPUPPO
BY Herbert W. Arnold
ATTORNEY

United States Patent Office 3,334,297
Patented Aug. 1, 1967

3,334,297
APPARATUS FOR MEASURING WELDING POWER UTILIZING A WELD SIMULATING RESISTOR SENSOR
Carter P. Pfaelzer, Concord, and Santo A. Sapuppo, Lawrence, Mass., assignors to Raytheon Company, Lexington, Mass., a corporation of Delaware
Continuation of application Ser. No. 176,071, Feb. 27, 1962. This application Sept. 23, 1966, Ser. No. 581,659
2 Claims. (Cl. 324—72)

This is a continuation of Ser. No. 176,071, filed Feb. 27, 1962 and now abandoned.

This invention relates to electrical power and energy measurement and is more particularly concerned with apparatus for measuring the energy and power transmitted from the welding electrodes of AC or DC welding devices.

The difference between a satisfactory and unsatisfactory weld can correspond to a peak power variation of as little as five percent. A need exists for an energy measuring device which accurately measures the output of a welding device in order to permit the exclusion of the welder electrical output as a process variable so that a plurality of separate welding devices can be calibrated to a desired individual welding output.

The present invention provides an electrical measuring system wherein the above-mentioned variables are effectively eliminated. This is achieved by interposing a weld-simulating means between the electrodes of a welder, the total energy and peak power transmittal characteristics of which are desired to be known. The weld-simulating means comprises an impedance element of extremely low temperature coefficient of resistivity. The impedance element is interposed between two plates of high thermal conductivity material, such as copper. The impedance of the weld simulating means which includes the copper plates is adapted to provide a total resistance such as, for example, a resistance of a fraction of an ohm, to simulate the average resistance of a weld. The outer surfaces of the two copper plates which are exposed to the welder electrodes, are coated with noncorrosive material, such as gold or silver, to prevent oxidation of the plate surfaces and a resultant decrease in accuracy caused by changes in contact resistance, or loss of energy transmitted to the weld simulating means by chemical reaction during the welding process. In the present embodiment, the weld-simulating means is encapsulated in epoxy resins, with the exception of an exposed surface at the points of contact between the copper plates and the welder electrodes. Encapsulation is provided in order to prevent movement of the copper plates. Leads connected to the copper plates couple the energy transmitted into the weld-simulating means to a voltage step-up transformer of approximately one to twelve turns ratio which forms the input transformer for a measuring and nulling circuit. The power transmitted to the weld simulator is thus coupled to a peak-linear detector circuit or to an integrator circuit for comparison with an accurate reference voltage source so as to obtain an accurate reading of the peak power, average power, or the integral of the voltage waveform transmitted into or developed across the weld simulator.

By use of the measuring apparatus as described, a plurality of welders can be set to the correct level of output for each type of material to be welded and by such calibration method maintained at this correct output level notwithstanding individual changes in welding electrode tip surfaces by oxidation, etc., or, in connection with D-C welders, changes in the value of the individual capacitance banks due to aging and temperature effects. In addition, since the weld-simulating means does not have to be integrated into the welding apparatus, but may operate separated therefrom, a number of welders can be calibrated by switching a single weld-simulator to each welder as required.

The foregoing and other objects of this invention will be best understood from the following description of an embodiment thereof, reference being had to the accompanying drawings, wherein:

FIG. 1 illustrates an embodiment of the invention in schematic form;

FIG. 2 is an enlarged front view of one embodiment of the weld-simulating means; and FIG. 3 illustrates an enlarged cross-sectional view along line 3—3 of FIG. 2 of an embodiment of the weld-simulating means shown interposed between welding electrodes.

In FIG. 1, welding power is transmitted from welding electrodes 10, which may be connected to any known AC or DC welding power source welding cables, shunt straps and tie-points, etc., not shown, to weld-simulator 11. The electrical energy transmitted to the weld-simulator 11 from the welding electrodes 10 is given by the well-known equation:

$$W = EQ$$

wherein: Q is the quantity of charge transmitted, and W is the energy transmitted. Since the quantity charge transmitted is equal to the instantaneous current I multiplied by the time of transfer T, the energy W may also be expressed as:

$$W = EIT$$

wherein: W is expressed in joules, the electromotive force E from the welding electrodes is expressed in volts, and the instantaneous current I is expressed in amperes and the time T in seconds.

Since the rate of expanding energy in a circuit is the power supplied to it, the power may be derived by differentiating the foregoing expression with respect to time. Thus, the power supplied is:

$$P = EI$$

This power, represented as the product of the instantaneous electromotive force E and the instantaneous current I is coupled to the primary 12 of voltage step-up transformer 13. The step-up transformer 13 has a primary to secondary turns ratio of one to twelve. Thus, one volt transmitted into the weld-simulator 11 is reproduced in the secondary 14 of transformer 13 as substantially 12 volts. Of course, the current ratio is correspondingly stepped down so that, for example, 1.2 amperes in the weld-simulator 11 results in .1 ampere in the secondary 14 of transformer 13. The power is then coupled through polarity reversing switch 15, which may be in either of the two positions shown, to integrating switch 16, which in the peak-power position 17, bypasses the power output of transformer winding 14 around variable integrating resistor 18 to contact 19 of the sample-hold circuit switch 20. When the arm of switch 20 is moved to the "on" position 19, the power transmitted to the weld simulator is coupled to a peak linear detector circuit of the type described on pages 495 through 497 of "Fundamentals of Vacuum Tubes" by Austin V. Eastman, 2nd edition, 1941. This linear detector circuit comprises diode detector 21, charging capacitor 22 and grid resistor 23, and presents a high impedance to power having a voltage below a predetermined value, such as ground potential. Thus, only positive going waveforms of input power are permitted to pass to side 24 of charging capacitor 22. The charging capacitor 22 is then charged during a time fixed by the time constant of the charging capacitor-diode combination. The timing is such that the charging capacitor 22 charges to a voltage which is proportional to greater than 90 percent of the peak power transmitted into the weld-simulator. When a positive voltage appears at the junction of diode 21 and capacitor 22, cathode follower tube 25 begins to conduct more heavily. This voltage is then reproduced with substantially zero distortion by conduction of cathode follower tube 25, which conducts from ground through variable cathode potentiometer 26 to cathode-follower plate 52, resulting in a voltage substantially equal to the voltage present at the junction of diode 21 and capacitor 22. Current then flows from ground through the meter circuit comprising the lower portion of ten-turn potentiometer 27, ammeter 28, calibration resistor 29, sensitivity-adjust resistor 30, to the potential established at variable cathode follower resistor 26. In addition, an alternate path of current flow exists from ground through ten-turn potentiometer 27 to a voltage reference at junction 31. The voltage at junction 31 is obtained from battery voltage source 32 and is developed by the voltage drop occurring across voltage reference resistor 33 and the voltage drop across reference voltage adjustment resistor 34 and is regulated by the diode regulator stack 35, which may comprise 4–1N825A diodes. It can thus be readily observed that by movement of vernier dial 36, which is coupled to wiper arm 37 of ten-turn potentiometer 27, more or less current can be caused to flow through ammeter 28, which may be a 50–0–50 microampere null meter. The current flow is directly proportional to the difference between peak power voltage present at the wiper arm 38 of variable cathode potentiometer 26 and the reference voltage present at junction 31. Thus, by suitable calibration of vernier 36, an accurate direct reading with high resolution can be obtained of the peak power transmitted to the weld simulator during a predetermined weld period.

Integration of the power transmitted to the weld simulator to obtain the proportional energy transmitted to the weld simulator is accomplished in substantially the same manner, with the added introduction, by closing integrating switch 16 to position 39, as shown, placing variable integrating resistor 18 in series with detector diode 21. Variable integrating resistor 18 is set in a predetermined value, varying from 0 to 1 megohm, thus obtaining an integrating time constant of from 0 to one second, which will allow integration of, for example, approximately 60 watt-second pulses transmitted to weld simulator 11. The integrated wave shape is then coupled to meter 28 in substantially the same manner as described above in the disclosure of the peak power circuit. Thus, a direct reading proportionate to the energy transmitted to the weld simulator 11 over a predetermined time period corresponding to the portion of the weld cycle to be measured is obtained.

Polarity switch 15 allows examination of either positive or negative half-cycles of input power to the weld simulator by effectively rotating the coupling between the primary 12 and the secondary 14 of transformer 13 one hundred and eighty degrees, dependent on the position of switch 15. This feature of the present invention is provided to accommodate welders having maximum output in one direction from the welding tips. Filament voltage for cathode follower filament 40 of 1.4 volts is obtained from battery supply 41.

A reset button 42 is provided in accordance with the present invention to allow discharge of the charging capacitor 22 to ground between measurements.

Parallel diodes 43 are provided in accordance with the present invention to protect the meter circuit from sudden excessive current surges and provides for non-linearity of the metering circuit.

Power source 32 provides B+ power to the plate 52 of cathode follower 25 and the reference voltage circuit, in particular, junction 31. Power source 32 and battery 41 are coupled to the aforementioned circuits by means of a four-pole switch 53. Also associated with power source 32 is a novel circuit for warning the operator of the present invention when the supply voltage from the power source 32 drops below substantially ten percent of its rated value. In accordance with this warning circuit, a neon lamp 54 is supplied initially with twice the supply voltage by means of capacitor 55 which is initially charged to a value equal to the voltage from the battery. When switch 53 is turned "on" this voltage, plus the battery voltage, appears directly across neon lamp 54, igniting it. With switch 53 in the "on" position, one side of capacitor 55 is now grounded through arm 56 of switch 53. Thus, after a period of time determined by the discharge time of capacitor 55, only the voltage from battery 32 is present on neon lamp 54. The neon lamp continues to remain "on" after this initial transient is applied to it because a lamp of this type will remain ignited at a lower voltage than that required for original ignition. However, when the supply voltage drops by about ten percent, the neon lamp 54 is extinguished, thereby indicating to the operator that the power supply battery 32 has degraded below substantially ten percent, which would affect the accuracy of the power and energy measurements of the present invention.

Referring now to FIGS. 2 and 3, wherein the details of the weld simulator 11 can best be seen, in one embodiment of the present invention, FIG. 2, a plate of Manganin 62 is formed into a Z shape and inserted in contact between two copper plates 60 and 61. The copper plates 60 and 61 are each formed, as shown, to have a narrow space or gap 63 between the copper surfaces exposed to the welding current from welding electrodes 10. Electrical output leads 68 are provided, in contact with the copper plates 60 and 61, to allow coupling of the energy input to the weld simulator 11 to detecting means described in association with FIG. 1. The outer surfaces of the copper plates 60 and 61 are coated with a non-corrosive material 66, such as gold, rhodium, or silver to prevent oxidation of the copper plate surfaces and resultant decrease in accuracy caused by contact resistance changes or energy losses due to electrolytic action during discharge of the welder. Insulating material 64, such as epoxy resin, fills the interior of the weld-simulator structure, including the gap 63, as shown.

Manganin (84Cu12Mn4Ni), having a temperature coefficient of resistivity substantially equal to ± .00002 ohm/degree centigrade/ohm, has been used in the present embodiment of this invention, but since other equally low temperature coefficients of resistivity materials may be readily substituted, such as, therlo or constantin, use of Manganin in the preferred embodiment should not limit the present invention thereby.

The present invention is also adapted to be utilized for accurate measurement of tip-force versus welder-output, called an "Iso-Strength" plot, for a given combination of materials to be welded. From this plot, the point of minimum gradient in weld strength for tip-force and welder electrical output is then selected for most reliable operation. This point is in the region of highest weld strengths. By use of the present invention, the Iso-Strength plot for round 42 alloy resistor leads and .01 by .02 inch nickel ribbon was determined using a single welder. The best operating point was then picked, and three additional machines were set up to operate at this same point in peak power. Fifty welds were then made on each of the four welders. Twenty-eight percent of the welds exceeded the breaking strength of the nickel ribbons (which is fourteen pounds) by some unknown margin. The average breaking strength was 13.8 pounds, which is .2 pound less than the breaking strength of the nickel ribbon. No welds less than nine pounds in strength were found. For this combination, five pounds breaking strength is considered an insufficient weld. Analysis of the data leads to the conclusion that there would be a chance of less than one part in a billion of having a bad weld using the present invention for this combination. Use of the present invention will thus constitute a means of achieving exceptionally high welding reliability. Even for material not readily weldable, the present invention furnishes a means for controlling one variable, namely, the welder output, and thereby permits higher reliability than would otherwise be obtained.

Present procedure for establishing correct welder output consists of a process of slowly advancing the power out of the welder in making a number of welds and breaking them to determine where the outcome of breaking strength occurs. Electrical output is thus adjusted by a trial and error procedure.

For the foregoing reasons, it is to be understood that the above-described arrangements are illustrative of the application of the principles of the invention. For example, a transistor or semiconductor device may be substituted for the tube shown in FIG. 1, where it is desirable to eliminate a filament supply. Thus, since many modifications will be apparent to persons skilled in the art without departing from the spirit and scope of this invention, it is desired that this invention not be limited by the particular details described herein except as defined by the appended claims.

What is claimed is:

1. In combination with an intermittently operated capacitive discharge type welding device having a pair of welding electrodes:

apparatus for measuring the welding power during the weld period comprising high thermal conductivity metallic members adapted to be in contact with said welding electrodes;

an impedance element of low temperature coefficient resistivity selected from the group of alloys consisting of therlo, Manganin and constantin connected between said metallic members at a point removed from the point of contact by said welding electrodes;

the combined impedance of said metallic members and low resistivity element providing a total resistance substantially equal to the average resistance of the material to be welded;

a voltage step-up transformer;

electrically conductive means connected to said metallic members to couple the voltage signals generated when current passes through the welding electrodes to said transformer;

peak linear voltage detector circuit means connected to said transformer to generate a voltage waveform output responsive to the welding current signals;

reference voltage source means;

and means for comparing the detected signal output and reference voltage to produce a difference voltage output signal to obtain a direct reading of peak power passing through the welding electrodes during the weld period.

2. In combination with an intermittently operated capacitive discharge type welding device having a pair of welding electrodes;

apparatus for measuring the welding power during the weld period comprising high thermal conductivity metallic members adapted to be in contact with said welding electrodes;

an impedance element of low temperature coefficient resistivity selected from the group of alloys consisting of therlo, Manganin and constantin connected between said metallic members at a point removed from the point of contact by said welding electrodes;

the combined impedance of said metallic members and low resistivity element providing a total resistance substantially equal to the average resistance of the material to be welded;

a voltage step-up transformer;

electrically conductive means connected to said metallic members to couple the voltage signal generated when current passes through the welding electrodes to said transformer;

means for integrating said voltage signal serially connected to said transformer;

peak linear voltage detector circuit means connected to said integration means to generate an integrated voltage waveform output indicative of the welding current signals;

reference voltage source means;

and means for comparing the detected signal output and reference voltage to produce a difference voltage output signal to obtain a direct reading of the integral of the average power passing through the welding electrodes during the weld period.

References Cited

UNITED STATES PATENTS

| | | | |
|---|---|---|---|
| 2,752,467 | 6/1956 | Peretz | 324—127 X |
| 2,925,557 | 2/1960 | Davis | 324—103 |

WALTER L. CARLSON, *Primary Examiner.*

E. L. STOLARUN, *Assistant Examiner.*